(12) United States Patent
Bourlon

(10) Patent No.: US 9,809,208 B2
(45) Date of Patent: Nov. 7, 2017

(54) PLANET CARRIER FOR AN ELECTROMECHANICAL ACTUATOR OF A PARKING BRAKE, ACTUATOR AND ASSEMBLY METHODS

(71) Applicant: CHASSIS BRAKES INTERNATIONAL B.V., Amsterdam (NL)

(72) Inventor: Philippe Bourlon, Dammartin en Goele (FR)

(73) Assignee: CHASSIS BRAKES INTERNATIONAL B.V., Eindhoven (NL)

( * ) Notice: Subject to any disclaimer, the term of this patent is extended or adjusted under 35 U.S.C. 154(b) by 88 days.

(21) Appl. No.: 14/652,685

(22) PCT Filed: Dec. 18, 2013

(86) PCT No.: PCT/EP2013/077041
§ 371 (c)(1),
(2) Date: Jun. 16, 2015

(87) PCT Pub. No.: WO2014/095966
PCT Pub. Date: Jun. 26, 2014

(65) Prior Publication Data
US 2015/0330467 A1 Nov. 19, 2015

(30) Foreign Application Priority Data
Dec. 19, 2012 (FR) ...................................... 12 62291

(51) Int. Cl.
*B60T 13/74* (2006.01)
*F16H 57/08* (2006.01)
(Continued)

(52) U.S. Cl.
CPC ............ *B60T 13/745* (2013.01); *F16D 65/18* (2013.01); *F16H 57/0006* (2013.01);
(Continued)

(58) Field of Classification Search
CPC .... F16D 65/18; F16H 57/0006; F16H 57/082; F16H 2057/0056
See application file for complete search history.

(56) References Cited

U.S. PATENT DOCUMENTS

| 4,804,073 A | 2/1989 | Taig et al. |
| 7,021,415 B2 | 4/2006 | Farmer et al. |

(Continued)

FOREIGN PATENT DOCUMENTS

| FR | 2 111 638 A1 | 6/1972 |
| FR | 2 853 382 A1 | 10/2004 |

(Continued)

OTHER PUBLICATIONS

International Search Report, dated Feb. 20, 2014, from corresponding PCT application.

*Primary Examiner* — Jacob S Scott
(74) *Attorney, Agent, or Firm* — Young & Thompson

(57) ABSTRACT

The invention proposes a planet carrier (50) for a planetary gear train of a reducing mechanism of an electromechanical actuator for actuating a parking brake of a motor vehicle, which carries planet pinions (52), each of which is accommodated between two parallel support plates (56, 58) belonging to a reinforcement (54) of the planet carrier and each of which is mounted in rotation on the planet carrier (50) about a rotation guide pin (74) that is mounted between the two support plates (56, 58) to which it is linked by the two opposing axial ends thereof, characterized in that each rotation guide pin (74) is a tubular pin.

20 Claims, 8 Drawing Sheets

(51) Int. Cl.
  *F16D 65/18* (2006.01)
  *F16H 57/00* (2012.01)
  *F16D 121/24* (2012.01)
  *F16D 125/50* (2012.01)

(52) U.S. Cl.
  CPC ....... *F16H 57/082* (2013.01); *F16D 2121/24* (2013.01); *F16D 2125/50* (2013.01); *F16H 2057/0056* (2013.01); *Y10T 29/49828* (2015.01)

(56) References Cited

U.S. PATENT DOCUMENTS

| | | | |
|---|---|---|---|
| 8,574,119 B1 * | 11/2013 | Kinter | F16H 57/082 |
| | | | 475/331 |
| 2003/0178264 A1 | 9/2003 | Halasy-Wimmer et al. | |
| 2004/0082420 A1 | 4/2004 | Robinson | |
| 2004/0259679 A1 | 12/2004 | Becquerelle et al. | |
| 2006/0293142 A1 | 12/2006 | Torres et al. | |
| 2012/0196720 A1 | 8/2012 | Miyawaki et al. | |
| 2014/0045644 A1 * | 2/2014 | Boland | F16H 57/082 |
| | | | 475/331 |

FOREIGN PATENT DOCUMENTS

| | | |
|---|---|---|
| JP | 4529138 | 11/1970 |
| JP | 4887477 | 10/1973 |
| JP | 2003/130143 A | 5/2003 |
| JP | 2004108451 | 4/2004 |
| JP | 2011116338 | 6/2011 |
| JP | 2012092907 | 5/2012 |

\* cited by examiner

PLANET CARRIER FOR AN ELECTROMECHANICAL ACTUATOR OF A PARKING BRAKE, ACTUATOR AND ASSEMBLY METHODS

TECHNICAL FIELD OF THE INVENTION

The present invention relates to a planet carrier for a planetary gear train of a reducing mechanism of an electromechanical actuator for actuating a parking brake of a motor vehicle, also able to perform the function of an emergency brake, integrated in a hydraulically actuated disk brake.

The invention also relates to an electromechanical actuator for actuating a parking brake of a motor vehicle, comprising a reducing mechanism integrating a planet carrier of this type.

The invention also relates to a method for assembling a planet carrier of this type.

PRIOR ART

The structure of a hydraulically controlled disk brake comprising an electromechanical parking brake is known, in particular from U.S. Pat. No. B2-7,021,415.

As is known, the brake comprises a caliper able to support and to slidingly guide two opposing friction pads able to cooperate with a rotating disk.

Independently of the primary hydraulic actuation of the disk brake, this disk brake comprises electromechanical means for actuation and operation of the disk brake as parking brake or emergency brake.

For this purpose the brake comprises a screw/nut pair or group that is arranged in the piston of the hydraulically actuated brake and, on the other hand, an electric geared motor assembly referred to as an electromechanical actuator for driving in rotation, in both directions, the screw of the screw/nut group.

The actuation of the parking brake by means of an electric motor belonging to this actuator requires the application of a very significant screwing torque to the screw of the screw/nut group, which torque is converted by the screw/nut group into a clamping axial thrust applied to the piston, in turn of very significant force, for example approximately two tons.

In order to produce such a screwing torque with short angular stroke of rotation of the screw whilst using an electric drive motor of the smallest dimensions possible, it is necessary to provide, in the actuator, a reducing mechanism, which is driven in rotation by the output shaft of the motor so as to drive in rotation an output element of the electromechanical actuator.

Among the different designs of such a reducing mechanism, and in particular among the geared reducing mechanisms, different solutions are known that require at least one reduction stage comprising a planetary gear train.

The reduction stage with planetary gear train comprises a planet carrier, which carries one or more planet pinions, each of which meshes with a fixed sun gear, which is toothed internally, belonging to the casing of the actuator, which can also accommodate the electric motor.

In this design the planet carrier constitutes the output element of the electromechanical actuator driving in rotation, directly or indirectly, the screw of the screw/nut group, whereas the electric motor directly or indirectly drives the central sun pinion, which meshes with the planet pinions of the planetary gear train.

Due to the very high load values applied to the different components of the reducing mechanism, and in particular of the planetary gear train, and due to the "quasi instantaneous" application of these loads, the set of components of the electromechanical actuator and in particular the different components of the planetary gear train are subjected to very significant impact forces under load, and it is necessary to provide means for damping or absorbing forces by elastic deformation.

Among the known solutions, illustrated in particular in U.S. Pat. No. B2-7,021,415, a toothed belt can be used in order to connect in rotation the output pinion of the electric motor to the planetary gear train.

It is also known to mount the sun gear of the planetary gear train in the casing of the electromechanical actuator with interpositioning of elastically deformable means.

These two solutions in particular have the disadvantage of increasing the overall bulk of the electromechanical actuator and of the casing which accommodates the different components of the actuator, and also consequently the unsprung mass.

All the dimensions of such an electromechanical actuator, in particular in the radial directions in relation to the parallel axes of rotation of the electric motor and of the planetary gear train, are detrimental to the general dimensioning of the disk brake, which must be integrated at least partially within the wheel for which it assures the braking.

The present invention aims to provide a solution to this problem and to remedy the disadvantages that have just been described.

SUMMARY OF THE INVENTION

With this objective, the invention proposes a planet carrier for a planetary gear train of a reducing mechanism of an electromechanical actuator for actuating a parking brake of a motor vehicle, which planet carrier carries planet pinions, each of which:
  is accommodated between two parallel support plates belonging to a frame of the planet carrier;
  and each of which is mounted rotatably on the planet carrier about a rotation guide pin that is mounted between the two support plates to which it is linked by the two opposite axial ends thereof,
characterized in that each guide pin is a tubular pin, and in that the frame is a frame produced by molding.

In accordance with other features of the planet carrier:
  the frame is a frame produced by plastics material molding, in particular molded in a number of parts;
  each tubular guide pin:
    extends axially through the two support plates;
    comprises a first axial end equipped with a radial stop collar, which bears axially against a portion opposite the outer face of a first of the two support plates; and
    comprises a second axial end, which is axially immobilized in relation to the second of the two support plates;
  the second axial end is axially immobilized in relation to the second support plate by at least one crimped zone of this second axial end, which extends radially outwardly facing a portion opposite the outer face of the second support plate;
  each tubular rotation guide pin is made of steel, the axial length of each tubular rotation guide pin is between 5 and 20 mm, the outer diameter of each tubular rotation guide pin is between 5 and 15 mm, and the radial thickness of each tubular rotation guide pin is between 0.5 and 2 mm;

the axial length of each tubular rotation guide pin is between 12 and 18 mm, the outer diameter of each tubular rotation guide pin is between 7 and 10 mm, and the radial thickness of each tubular rotation guide pin is between 0.6 and 1 mm;

the second axial end is axially immobilized in relation to the second support plate by at least two crimped zones, which are diametrically opposed, of the second axial end, each of which extends radially outwardly facing a portion opposite the outer face of the second support plate;

each tubular rotation guide pin is filled with an elastically deformable element;

the planet carrier comprises four planets angularly distributed regularly about an axis of rotation of the planet carrier.

The invention also proposes an electromechanical actuator for actuating a parking brake of a motor vehicle, which actuator comprises an actuator casing in which the following are accommodated, at least in part:

an electric motor comprising an output motor shaft; and a geared reducing mechanism that is driven in rotation by the output shaft of the motor so as to drive in rotation an output element of the actuator, and in which the reducing mechanism comprises at least one reduction stage comprising a planetary gear train having a planet carrier according to the invention.

In accordance with further features of the actuator:

the planet carrier constitutes the output element of the actuator;

an axis of rotation of the planet carrier is radially offset in relation to an axis of rotation of the output shaft of the motor.

The invention further proposes a method for assembling a planet carrier, for a planetary gear train of a reducing mechanism of an electromechanical actuator for actuating a parking brake of a motor vehicle, which planet carrier carries planet pinions, each of which is accommodated between two parallel support plates belonging to a frame of the planet carrier;

and is mounted rotatably on the planet carrier about a tubular rotation guide pin that is mounted between the two support plates to which it is linked by the two opposite axial ends thereof, characterized in that said method comprises the steps of:
producing a planet carrier frame;
introducing at least one planet between the two support plates;
axially inserting a tubular rotation guide pin successively through a first of the two support plates, the planet and the second of the support plates;
axially immobilizing the tubular guide pin in relation to the two support plates.

For the assembly of a planet carrier of which each tubular guide pin:

extends axially through the two support plates;
comprises a first axial end equipped with a radial stop collar, which bears axially against a portion opposite the outer face of a first of the two support plates; and
comprises a second axial end, which is axially immobilized in relation to the second of the two support plates, the method is characterized in that the step of axial insertion is completed as the radial stop collar bears axially against the portion opposite the outer face of the first support plate.

The immobilizing step consists of immobilizing the second axial end of the tubular guide pin in relation to the second support plate, by crimping at least one portion of this second axial end radially outwardly facing a portion opposite the outer face of the second support plate.

The present invention also proposes a method for assembling a motor vehicle brake, characterized in that said method comprises the steps of:

assembling a planet carrier in accordance with the method above;
producing an electromechanical actuator according to the invention comprising a planet carrier assembled in this way;
fixing an electromechanical actuator thus produced on a rear face of a caliper of a disk brake comprising an electromechanically actuated parking brake.

BRIEF DESCRIPTION OF THE FIGURES

Further features and advantages of the invention will become clear upon reading the following detailed description of an exemplary embodiment of the invention provided with reference to the accompanying drawings, in which.

DETAILED DESCRIPTION OF THE FIGURES

In the following description identical, analogous or similar elements and components will be denoted by the same reference signs.

Figure 1:
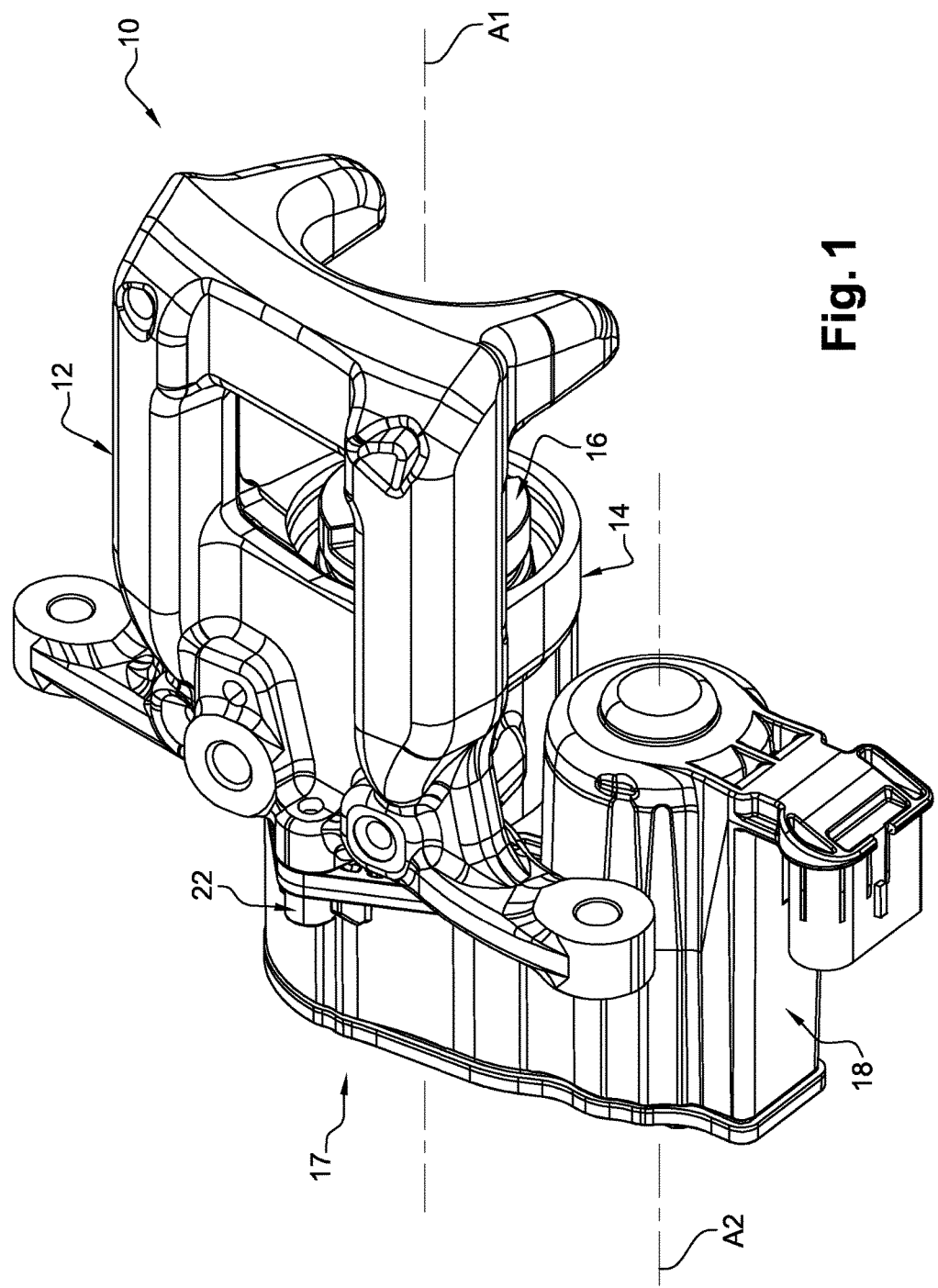
FIG. 1 is a general perspective view of a disk brake with parking brake comprising an electromechanical actuator according to the invention.
Figure 2:
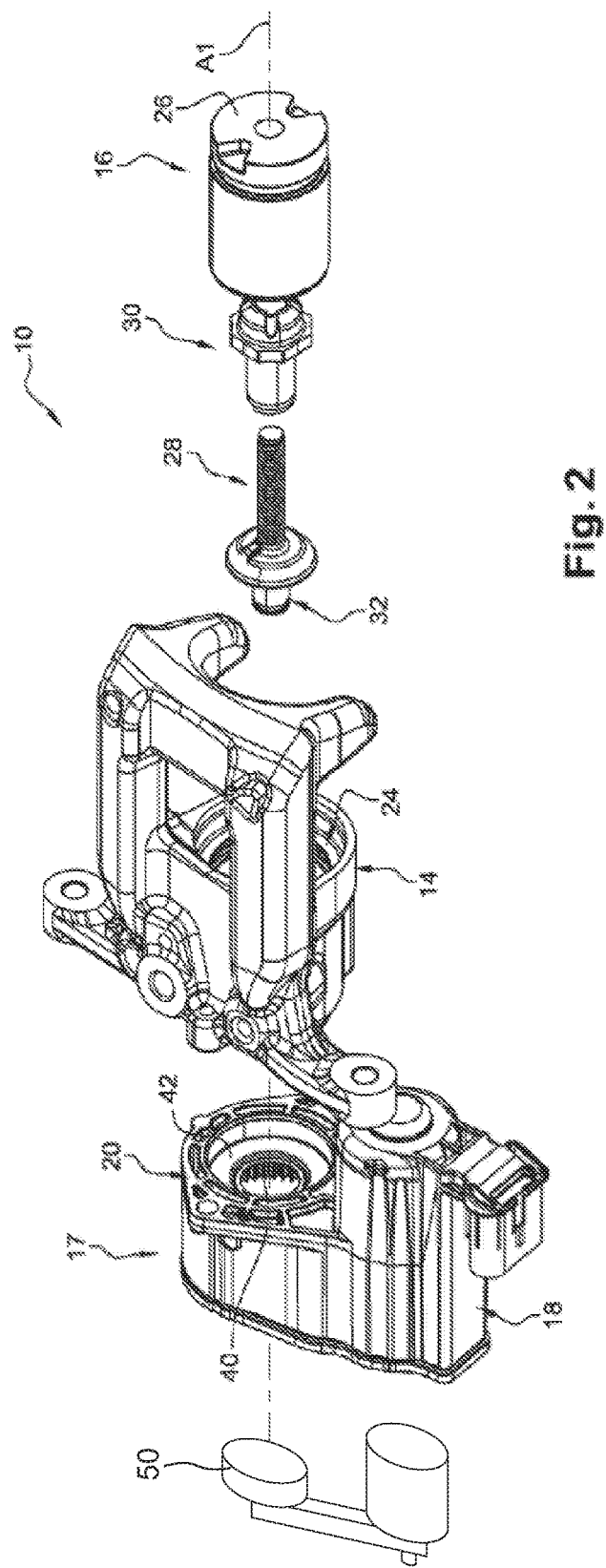
FIG. 2 is a view similar to that of FIG. 1, which shows the primary components of the brake of FIG. 1 in an exploded view.

FIGS. 1 and 2 show a disk brake 10, which is shown here without its brake pads and also without the associated means for sliding axial guidance and return of these pads.

The disk brake is formed essentially by a caliper 12 comprising a rear casing 14 in which a hydraulic brake piston 16 is mounted so as to slide axially from the rear to the front, i.e. from left to right under consideration of FIG. 1, along an axis A1.

The disk brake 10 comprises, at the rear, a geared motor or electromechanical actuator group 17, of which a casing 18 has been shown, which, as will be explained in detail hereinafter, accommodates an electric motor and a geared reducing mechanism with planetary gear train.

The casing 18 is connected and fixed on a rear transverse face of the caliper 12, against which the casing 18 bears axially via its open front-end transverse face 20, the fixation being assured here by screws 22.

The rear casing 14 of the caliper 12 delimits an axial hydraulic cavity 24, in which the piston 16 is mounted so as to slide axially tightly in the two directions, along the axis A1.

The brake piston 16 is a part of general cylindrical pot shape, open axially to the rear, and is able to cooperate, via its front outer transverse face 26, with a brake pad having an associated disk (not shown).

As is known, the supply of pressurized hydraulic fluid to the chamber 24 results in a hydraulic actuation of the brake by axial thrust toward the front of the piston 16 in relation to the rear casing 14 of the caliper 12.

As is known, for the mechanical actuation of the piston 16 in operation referred to as "parking", or also in emergency brake operation, the piston 16 and the chamber 24 accommodate a nut/screw group comprising a rear drive screw 28 and a front axial thrust nut 30.

In order to be driven in rotation in the two directions, the screw 28 comprises a rear section 32, which, in the assembled position, is accessible from the rear transverse face of the nut 12 so as to constitute a rotation drive head of the screw 28, which is driven in rotation in the two directions by a movement output element of the electromechanical actuator 17.

Figure 3A:
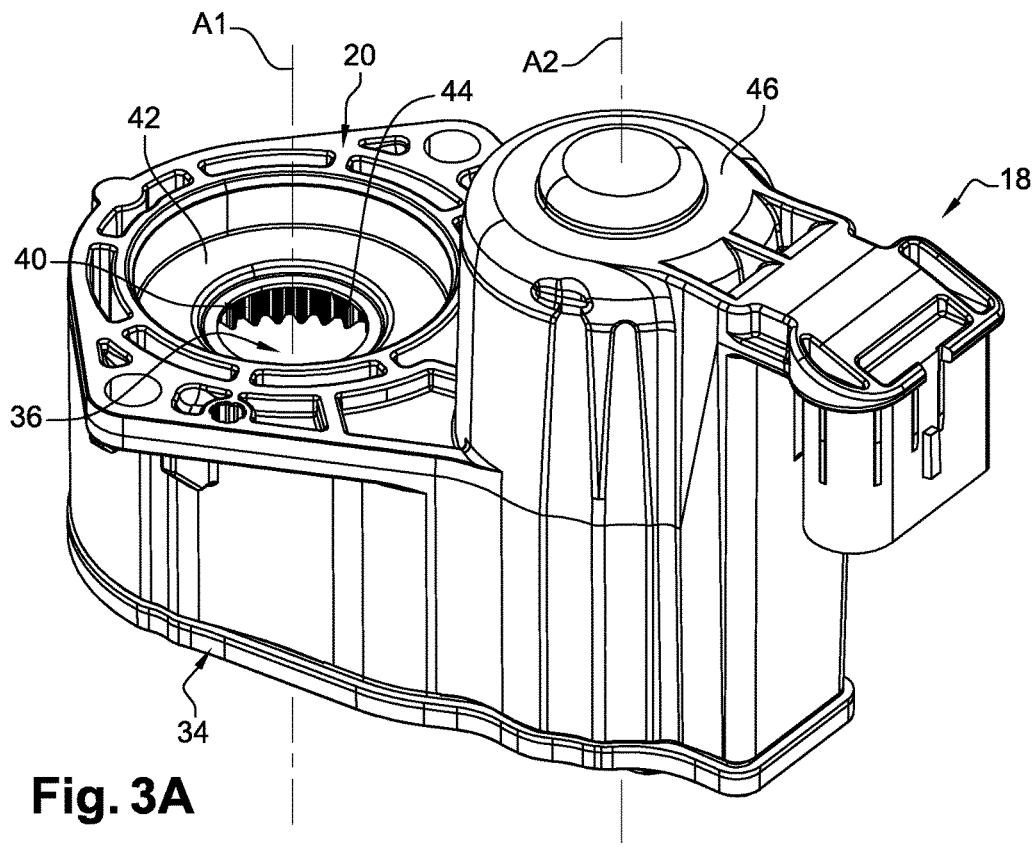
FIG. 3A is an enlarged perspective view of the casing of the electromechanical actuator shown in FIGS. 1 and 2.
Figure 3B:
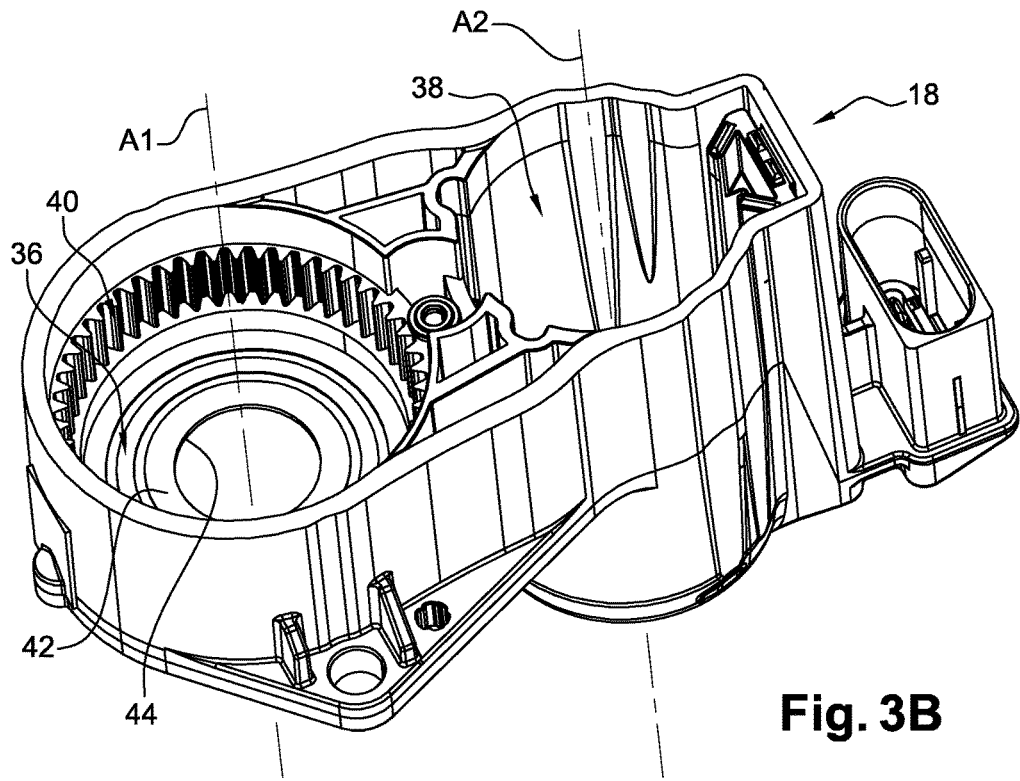
FIG. 3B is a perspective view of the casing shown in FIG. 3A.
Figure 4:
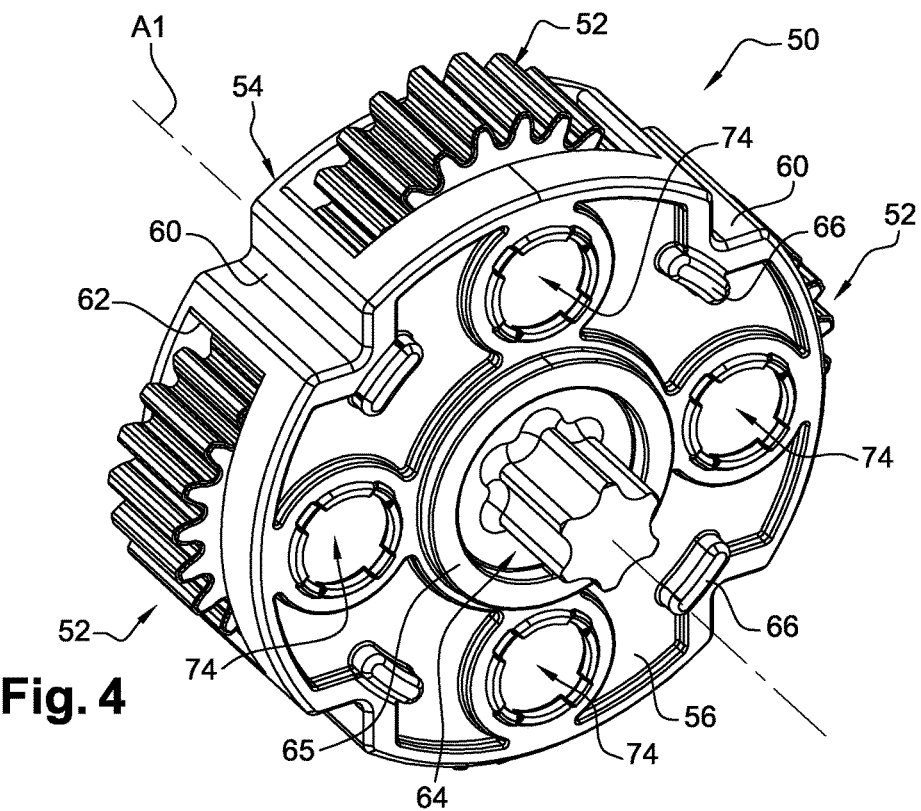
FIG. 4 is a perspective view of a planet carrier according to the invention.
Figure 5:
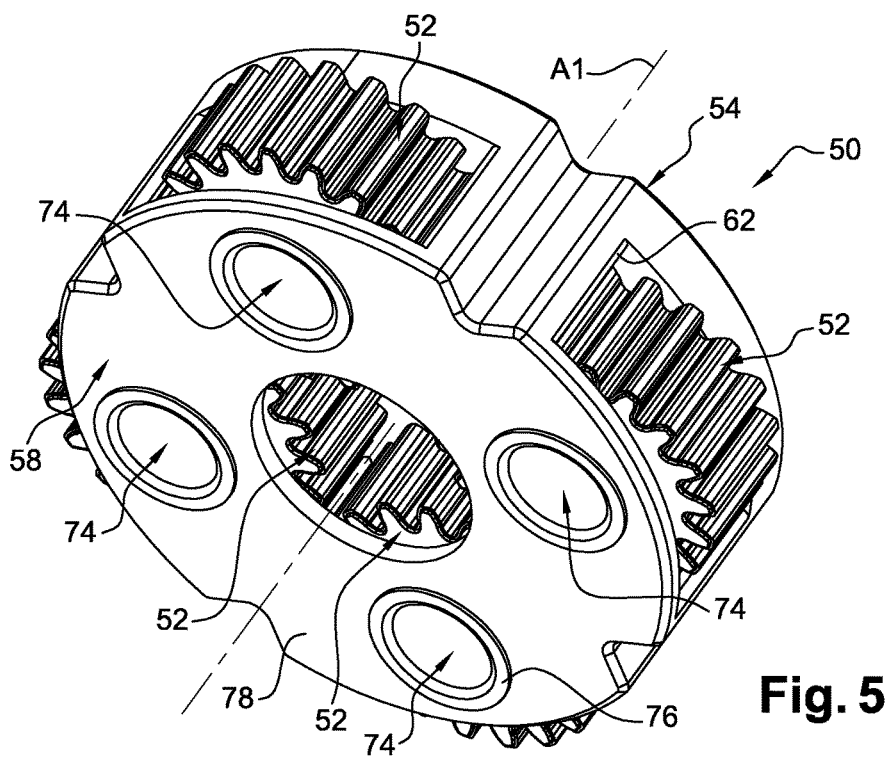
FIG. 5 is a perspective view, from a different angle, of the planet carrier of FIG. 4.
Figure 6:
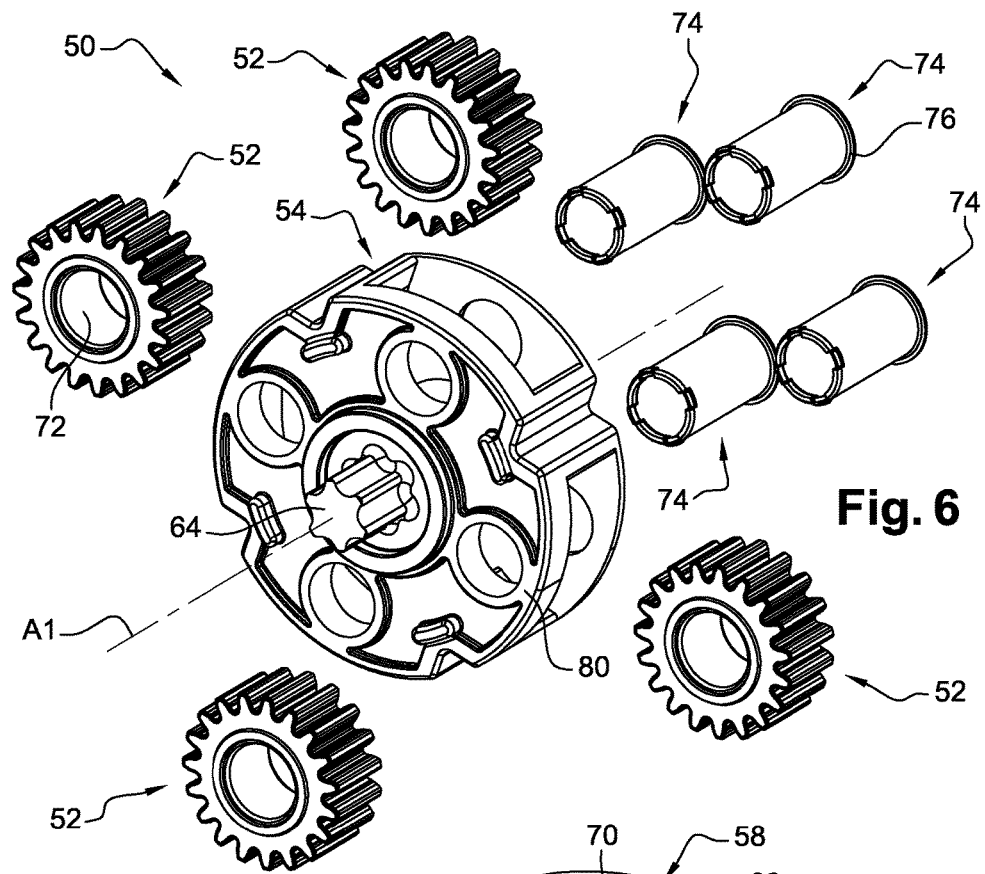
FIG. 6 is an exploded perspective view of the primary components of the planet carrier of FIG. 4.
Figure 7:
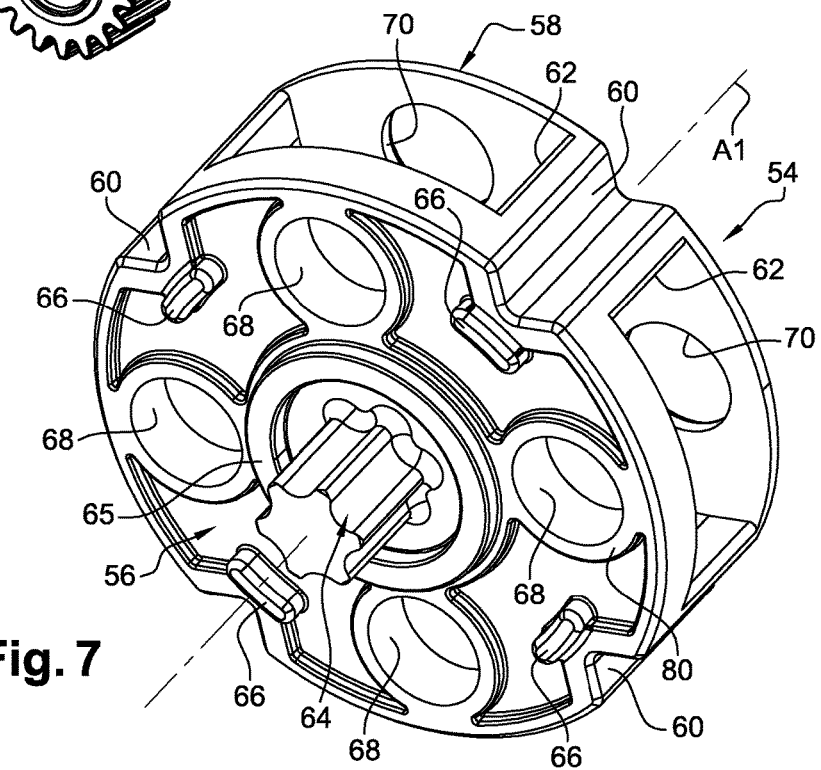
FIG. 7 is an enlarged perspective view of the frame with support plates of the planet carrier of FIG. 4.
Figure 8:
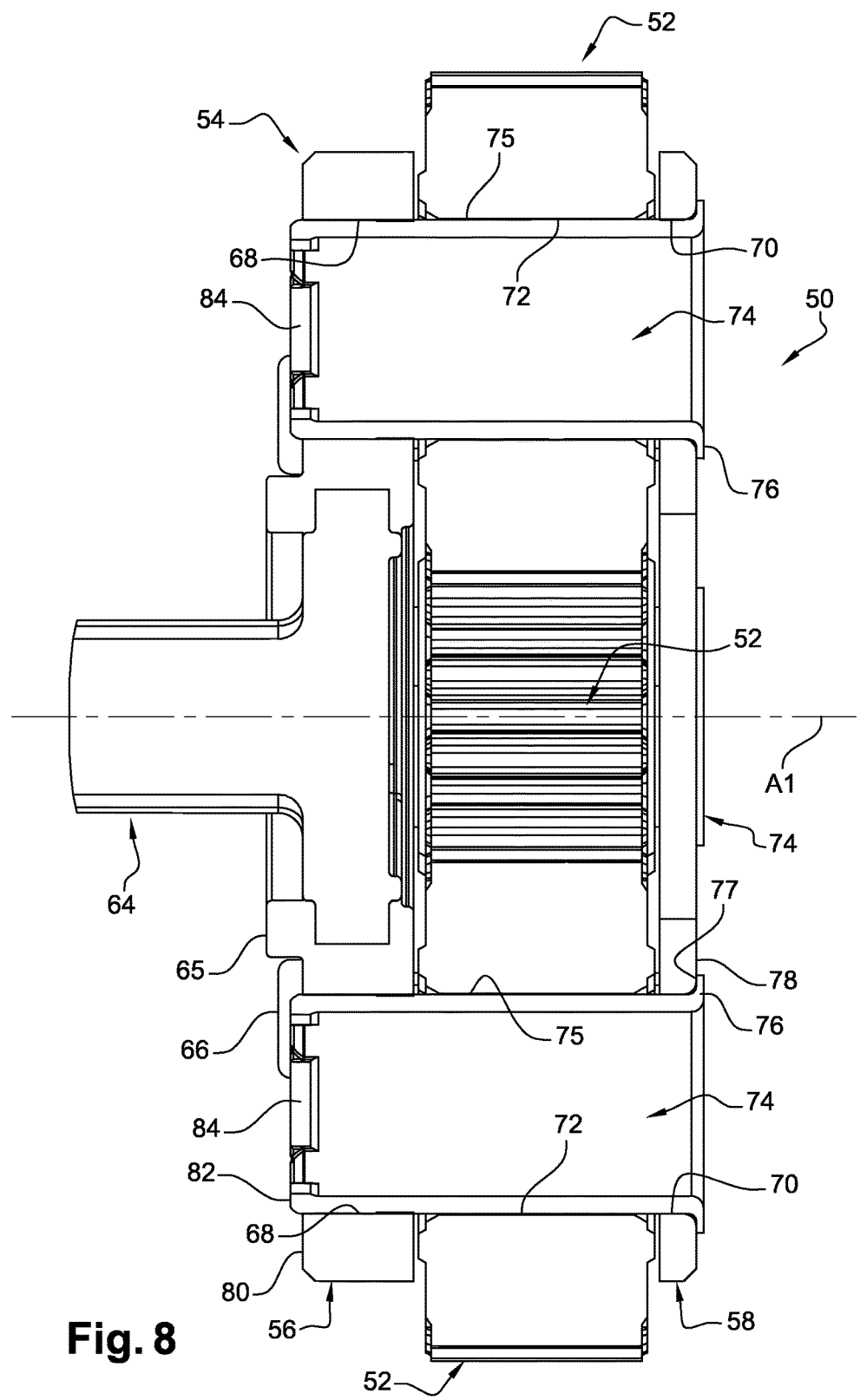
FIG. 8 is an enlarged view, in axial section taken along a plane passing via the axes of rotation of two diametrically opposed planets, of the planet carrier of FIG. 4.

As can be seen in FIGS. 3A and 3B, the casing 18 is a plastics material molded part, which internally delimits two primary recesses, each of general cylindrical pot shape, with parallel axes A1 and A2.

The casing 18 is closed by a rear cover 34, which is placed and welded or glued.

Before the cover 34 is placed in position, the two recesses 36 and 38 are axially open to the rear.

The first recess 36, to the left under consideration of FIGS. 3A and 3B, is provided in order to accommodate a planetary gear train of which an outer internally toothed ring gear 40 is formed here integrally with the casing 18 by molding.

The first recess 36 is closed axially toward the front by an annular base wall 42.

The annular base wall 42 comprises a central hole 44 for the passage of the movement output element of the planetary gear train.

The second recess 38, on the right under consideration of the figures, is also open axially to the rear and is designed to accommodate an electric drive motor (not shown) of which the output pinion is connected, by geared means (not shown), to the sun pinion of the planetary gear train accommodated in the first recess 36.

The second recess 38, which accommodates the electric motor, is closed axially toward the front by a base wall 46.

Thanks to the design according to the invention, and as can be seen in particular in FIG. 1, the general design of the electromechanical actuator 17 with its casing 18 is particularly compact, of reduced axial length toward the rear from the rear transverse face of the caliper, and with a significant front axial part of the casing accommodating the electric motor that extends axially, along the axis of rotation A2 of the motor, toward the front beyond the rear transverse face of the nut and along the length of the casing 14.

The planetary gear train 44 according to the invention, which, in the assembled position, is accommodated in the first recess 36, will now be described in detail.

By way of non-limiting example, a planetary gear train planet carrier 50 shown in FIGS. 4 to 8 here is a planetary gear train having four planet pinions 52 angularly distributed regularly about the primary axis A1 of the planet carrier 50.

The planet carrier 50 comprises a frame 54 of general "cage" form, which accommodates and rotatably carries the planets 52.

The frame 54 is essentially formed by two parallel support plates, specifically a front plate 56 and a rear support plate 58.

The two parallel support plates 56 and 58 extend in planes perpendicular to the axis A1 and are axially connected to one another by axial crossmembers 60, forming spacers between the support plates 56 and 58, which here are four in number and are angularly distributed regularly at the radial periphery of the support plates 56 and 58.

The crossmembers 60 angularly delimit therebetween four peripheral windows 62, through each of which a planet pinion 52 protrudes radially so as to mesh with the sun gear 40.

The frame 54 in planet carrier cage form is formed for example of plastics material molded in a number of parts.

The front support plate 56 centrally carries a movement output pinion 64, which protrudes axially toward the front and which is connected to the frame 54.

The outer face of the front support plate 56 comprises a central annular collar 65 for centering the planet carrier 50 in the recess 36 of the casing 18, which, in the mounted position of the planetary gear train, is centered in the hole 44 of the base wall 42.

The outer face also comprises four studs 66 for axial bearing toward the front of the planet carrier against a portion opposite the inner face of the base wall 42 of the first recess 36.

In the mounted position of the planet carrier 50, the planet pinions 52 mesh with the sun gear 40 of the first recess 36 of the casing 18.

In the vicinity of the periphery thereof, the front support plate 56 comprises four axial through-holes 68 angularly distributed regularly.

Similarly, the rear support plate 58 comprises four axial through-holes 70, the axial holes 68 and 70 being axially aligned in pairs.

The inner diameters of the holes 68 and 70 are identical here.

Each planet pinion 52 comprises an inner bore 72 so as to be mounted rotatably relative to the frame 54 of the planet carrier 50 by means of an associated rotation guide pin, or journal 74.

Each planet pinion 52 is mounted relative to the frame 54 in the manner of a fork assembly between the inner faces opposite the two front 56 and rear 58 support plates by means of an associated guide pin 74, which extends axially through a pair of aligned holes 68 and 70 and through the inner bore 72 of the planet pinion 52.

In accordance with the invention each pin 74 is a tubular element formed from a section of steel tube of constant radial thickness.

Figure 9A:
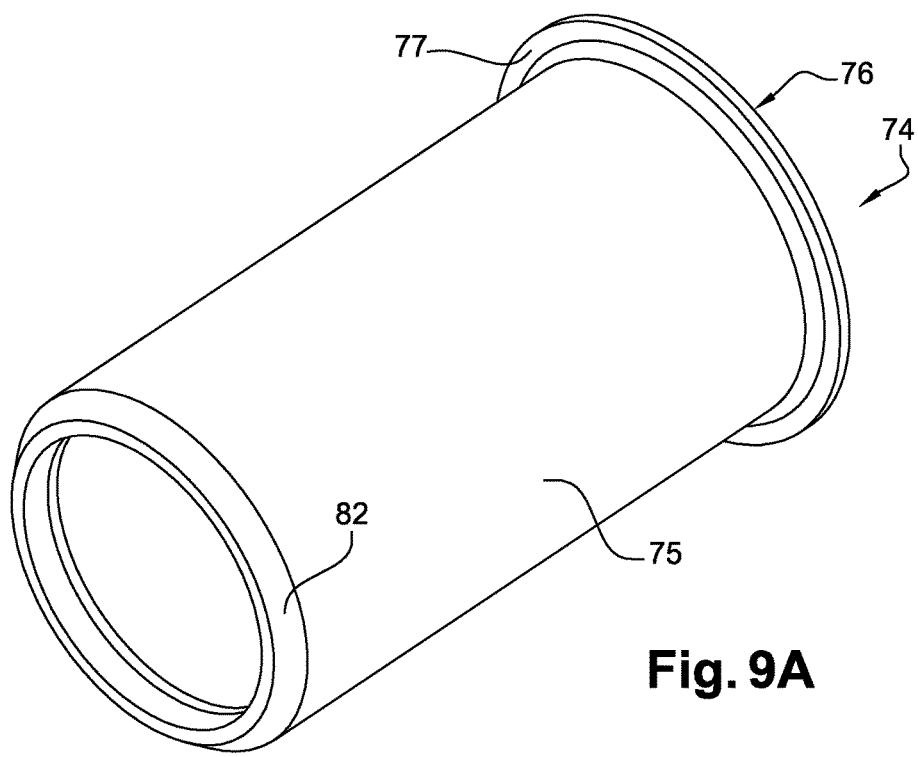
FIGS. 9A and 9B are two enlarged perspective views that show a tubular rotation guide pin of a planet carrier prior to assembly of the planet carrier and after assembly of the planet carrier.
Figure 9B:
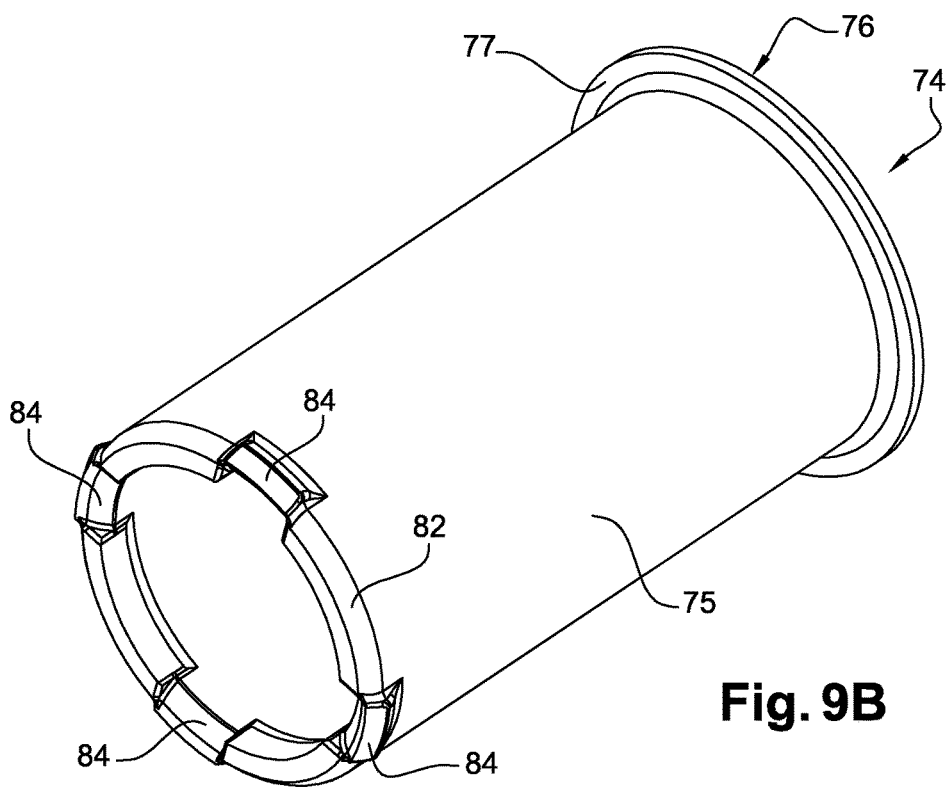

As can be seen in the figures, and in particular in FIG. 9A, each tubular pin 74 comprises, at the rear axial end thereof, a collar 76, which extends radially outwardly.

The collar 76 is a stop collar, which, in the assembled position, determines the axial position of the tubular axis 74 relative to the frame 54.

For this purpose, a front face 77 of the stop collar 76 bears axially toward the front against the portion opposite the outer face 78 of the rear support plate 58.

The front axial outer section of each tubular pin 74 extends axially through the associated hole 68 of the front support plate 56 such that the front axial end 82 of said pin protrudes axially beyond the outer face 80 of the front support plate 56 surrounding the associated hole 68.

In order to be immobilized axially in relation to the frame 54, each tubular pin 74 is fixed here by means of four crimped portions 84 of its front axial end 82.

Each crimped portion 84 is produced by plastic deformation by means of a crimping tool (not shown) and is deformed radially outwardly so as to extend facing the portion opposite the outer surface 80.

Due to its tubular design, and by comparison with a solid metal rotation guide pin, or journal, each tubular pin 74 has, under load, an ability to elastically deform temporarily so as to constitute an elastically deformable means for absorbing load impacts and in particular torque impacts to which the reducing mechanism is subjected, and in particular the components of the planetary gear train.

The different components of the planet carrier 50 are assembled or mounted as follows.

Each planet pinion 52 is introduced radially inside the frame 54 through a window 62 by aligning the inner bore 72 of said pinion with a pair of aligned bores 68 and 70.

A tubular pin 74 is then inserted, in the initial conformation thereof as shown in FIG. 9A, in which the front axial end 82 thereof is smooth and not deformed, successively and axially through a hole 70, a bore 72 and a hole 68.

The operation of mounting and assembling a planet pinion 52 with the tubular rotation guide pin 74 thereof is completed by performing the crimping operation in order to produce deformed crimped parts 84, ensuring that the crimping operation does not cause any deformation of the tubular pin 74, in particular so that the peripheral surface 75 of the central section of said pin maintains its cylindricity for the guidance in rotation of the associated planet pinion 52.

The invention is not limited to the embodiment that has just been described.

By way of a variant (not shown), the number of planet pinions may be different from four.

Likewise, the number of crimped portions 84 may be different from four.

In order to master the characteristics of elastic deformation under load and of absorption of each tubular pin, this can be filled, by way of a variant (not shown), with an elastically deformable element, for example made of an elastomer material.

With the same objective, each tubular rotation guide pin can be produced in the form of a concentric mounting of two tubular parts, referred to as "compound" mounting, wherein the inner tube or tubular element may be continuous or axially split.

The invention also is not limited to the means that have just been described and shown for the mounting and axial immobilization and rotational immobilization of each tubular guide pin in relation to the frame of the planet carrier.

For example, the crimped portions 84 may be replaced by a radial collar similar to the radial collar 76, which is formed by metal spinning.

Depending on dimensions and forces, each tubular pin 74 can also be axially fixed and immobilized by press fitting the two opposite axial end sections thereof in associated holes in the two front and rear support plates.

Without departing from the scope of the invention, each front and/or rear support plate may not be "solid", but for example may be produced in the form of a structure having radial arms arranged in a star shape.

By way of example, in the embodiment shown in the figures, each tubular pin 74 is advantageously made of steel, for example made of sheet steel, preferably XES or XS, or advantageously is made of spring steel, for example steel XC70.

The implementation of a frame 54 made of molded plastics material makes it possible to assure the precise positioning of planets, preferably without having to resort to machining.

The two parallel support plates 56 and 58 advantageously form a single molded part further improving the precision, and consequently the mechanical yield of the geared motor group.

Figure 10:
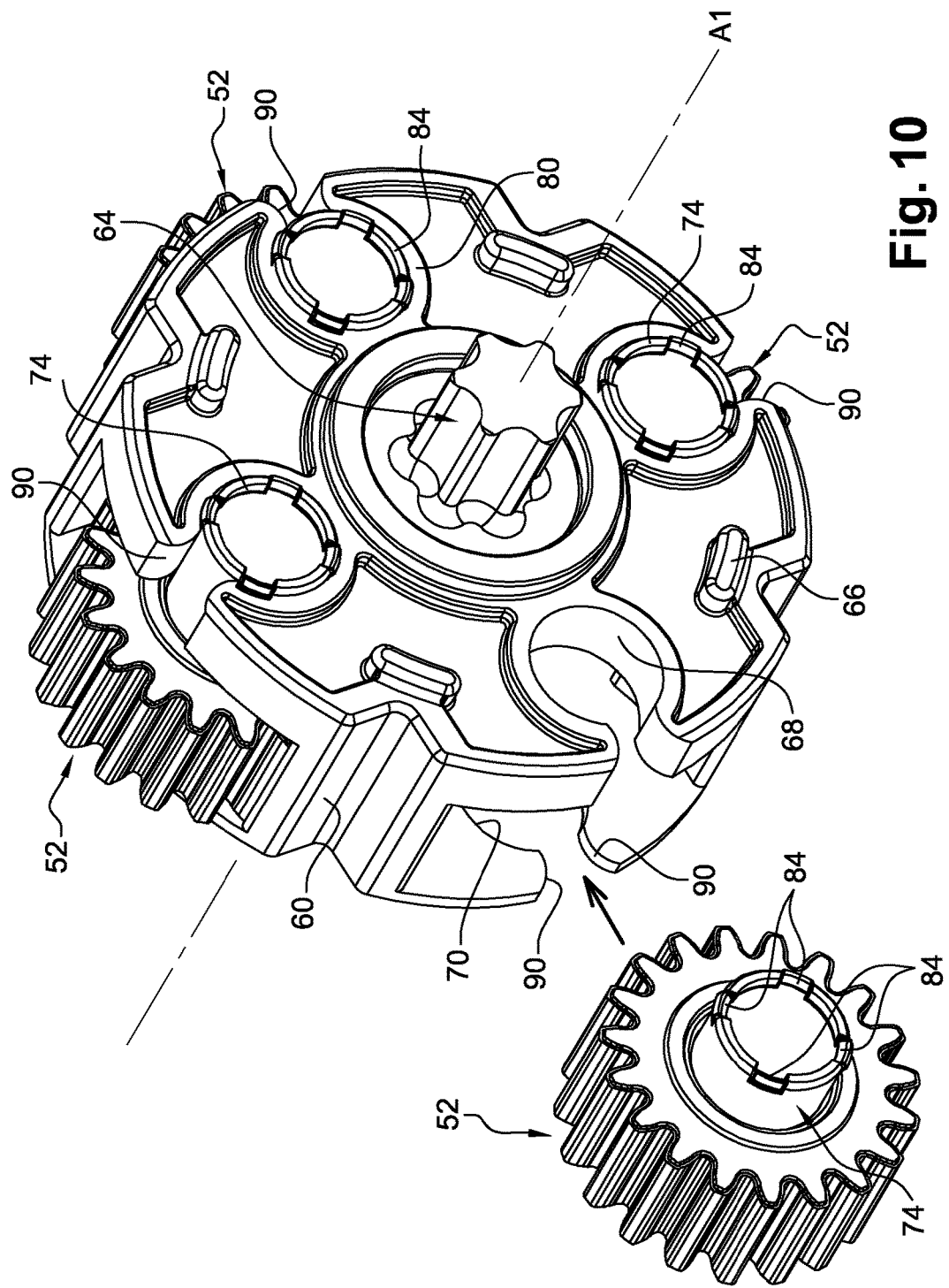
FIG. 10 is an isometric view of a variant of a planet carrier according to the invention.

In the example illustrated in FIG. 10, the frame 54 comprises passages 90 toward the pairs of aligned holes 68 and/or 70, the width of said passages being less than the outer diameter of the tubular pins 74, allowing the forced introduction of the tubular pins 74, perpendicularly to the axis A1 of the frame 54, by elastic fitting, i.e. by elastic deformation, of the edges of the passages 90 during the radial introduction of each pin 74. In the example shown in FIG. 10, three of the planets are in place, whereas one planet has not yet been introduced into its functional position.

This possibility of mounting by fitting in the radial direction makes it possible to produce each pin 74/pinion 52 sub-assembly beforehand by crimping of the crimped portions 84.

The invention claimed is:

1. A planet carrier for a planetary gear train of a reducing mechanism of an electromechanical actuator for actuating a parking brake of a motor vehicle, which planet carrier carries planet pinions, each of which:
   is accommodated between two parallel support plates belonging to a frame of the planet carrier;
   and is mounted rotatably on the planet carrier about a rotation guide pin that is mounted between the two support plates to which it is linked by the two opposite axial ends thereof,
   wherein each rotation guide pin is a tubular pin, and the frame is produced by molding.

2. The planet carrier as claimed in claim 1, wherein the frame is produced by plastics material molding, in particular molded in a number of parts.

3. The planet carrier as claimed in claim 2, wherein each tubular rotation guide pin:
   extends axially through the two support plates;
   comprises a first axial end equipped with a radial stop collar, which bears axially against a portion opposite the outer face of a first of the two support plates; and
   comprises a second axial end, which is axially immobilized in relation to the second of the two support plates.

4. The planet carrier as claimed in claim 3, wherein the second axial end is axially immobilized in relation to the second support plate by at least one crimped zone of this second axial end, which extends radially outwardly facing a portion opposite the outer face of the second support plate.

5. The planet carrier as claimed in claim 4, wherein the second axial end is axially immobilized in relation to the second support plate by at least two crimped zones, which are diametrically opposed, of the second axial end, each of which extends radially outwardly facing a portion opposite the outer face of the second support plate.

6. The planet carrier as claimed in claim 1, wherein each tubular rotation guide pin:
   extends axially through the two support plates;
   comprises a first axial end equipped with a radial stop collar, which bears axially against a portion opposite the outer face of a first of the two support plates; and
   comprises a second axial end, which is axially immobilized in relation to the second of the two support plates.

7. The planet carrier as claimed in claim 6, wherein the second axial end is axially immobilized in relation to the second support plate by at least one crimped zone of this second axial end, which extends radially outwardly facing a portion opposite the outer face of the second support plate.

8. The planet carrier as claimed in claim 7, wherein the second axial end is axially immobilized in relation to the second support plate by at least two crimped zones, which are diametrically opposed, of the second axial end, each of which extends radially outwardly facing a portion opposite the outer face of the second support plate.

9. The planet carrier as claimed in claim 6, wherein the second axial end is axially immobilized in relation to the second support plate by at least two crimped zones, which are diametrically opposed, of the second axial end, each of which extends radially outwardly facing a portion opposite the outer face of the second support plate.

10. The planet carrier as claimed in claim 1, wherein each tubular rotation guide pin is made of steel, in that the axial length of each tubular rotation guide pin is between 5 and 20 mm, in that the outer diameter of each tubular rotation guide pin is between 5 and 15 mm, and in that the radial thickness of each tubular rotation guide pin is between 0.5 and 2 mm.

11. The plant carrier as claimed in claim 10, wherein the axial length of each tubular rotation guide pin is between 12 and 18 mm, the outer diameter of each tubular rotation guide pin is between 7 and 10 mm, and the radial thickness of each tubular rotation guide pin is between 0.6 and 1 mm.

12. The planet carrier as claimed in claim 1, wherein each tubular rotation guide pin is filled with an elastically deformable element.

13. The planet carrier as claimed in claim 1, wherein the carrier comprises four planets angularly distributed regularly about an axis of rotation of the planet carrier.

14. An electromechanical actuator for actuating a parking brake of a motor vehicle, which actuator comprises an actuator casing in which the following are accommodated, at least in part:
   an electric motor comprising an output motor shaft; and
   a geared reducing mechanism, which is driven in rotation by the output shaft of the motor so as to drive in rotation an output element of the actuator,
   and in which the reducing mechanism comprises at least one reduction stage comprising a planetary gear train having a planet carrier as claimed in claim 1.

15. The electromechanical actuator as claimed in claim 14, wherein the planet carrier constitutes the output element of the actuator.

16. The electromechanical actuator as claimed in claim 14, wherein an axis of rotation of the planet carrier is radially offset in relation to an axis of rotation of the output shaft of the motor.

17. A method for assembling a planet carrier, for a planetary gear train of a reducing mechanism of an electromechanical actuator for actuating a parking brake of a motor vehicle, which planet carrier carries planet pinions, each of which
   is accommodated between two parallel support plates belonging to a frame of the planet carrier;
   and is mounted rotatably on the planet carrier about a tubular rotation guide pin that is mounted between the two support plates to which it is linked by the two opposite axial ends thereof,
   wherein said method comprises the steps of:
   producing a planet carrier frame;
   introducing at least one planet between the two support plates;
   axially inserting a tubular rotation guide pin successively through a first of the two support plates, the planet and the second of the support plates;
   axially immobilizing the tubular guide pin in rotation in relation to the two support plates.

18. The method as claimed in claim 17 for assembling a planet carrier of which each tubular rotation guide pin:
   extends axially through the two support plates;
   comprises a first axial end equipped with a radial stop collar, which bears axially against a portion opposite the outer face of a first of the two support plates; and
   comprises a second axial end, which is axially immobilized in relation to the second of the two support plates,
   wherein the step of axial insertion is completed as the radial stop collar bears axially against the portion opposite the outer face of the first support plate.

19. The assembly method as claimed in claim 18, wherein the immobilizing step comprises immobilizing the second axial end of the tubular rotation guide pin in relation to the second support plate, by crimping at least one portion of this second axial end radially outwardly facing a portion opposite the outer face of the second support plate.

20. A method for assembling a motor vehicle brake, wherein said method comprises the steps of:
   assembling a planet carrier in accordance with the method as claimed in claim 17;
   producing an electromechanical actuator comprising the planet carrier assembled as claimed in claim 10;
   fixing the electromechanical actuator thus produced on a rear face of a caliper of a disk brake comprising an electromechanically actuated parking brake.

* * * * *